Dec. 5, 1967  E. MORF  3,355,873
WATERTIGHT SHAPED WATCH
Filed July 8, 1965  4 Sheets-Sheet 1
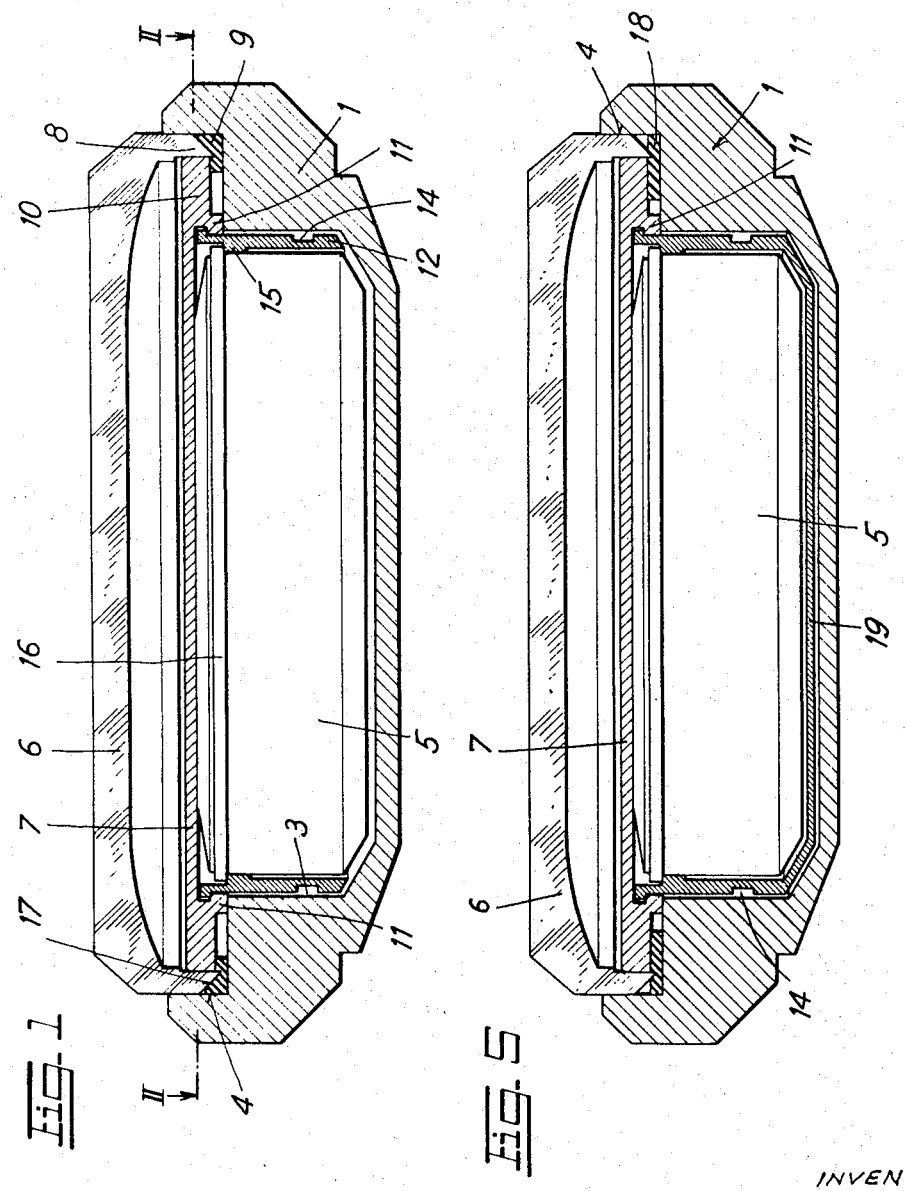
INVENTOR
ERNEST MORF
BY Christel & Bean
ATTORNEYS Dec. 5, 1967  E. MORF  3,355,873
WATERTIGHT SHAPED WATCH
Filed July 8, 1965  4 Sheets-Sheet 2
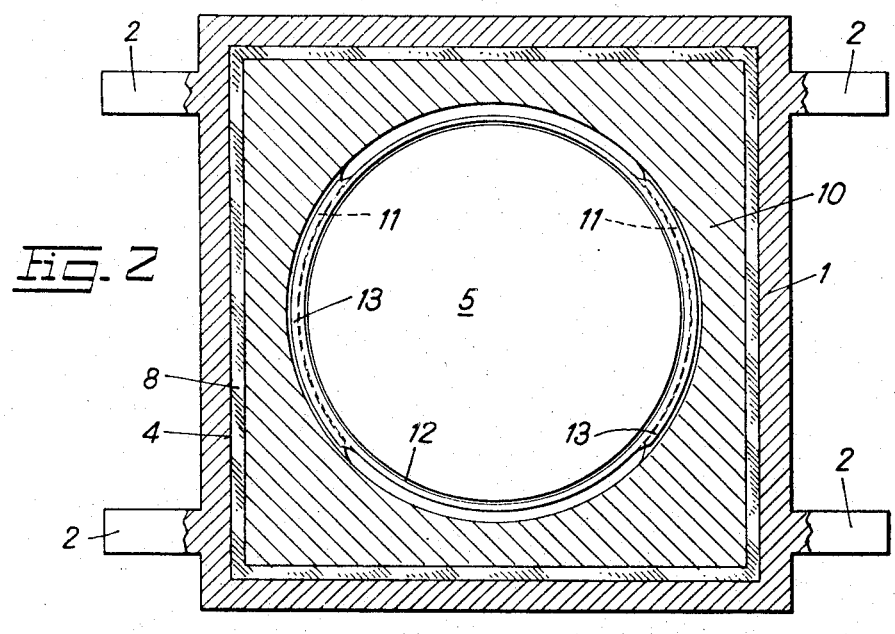
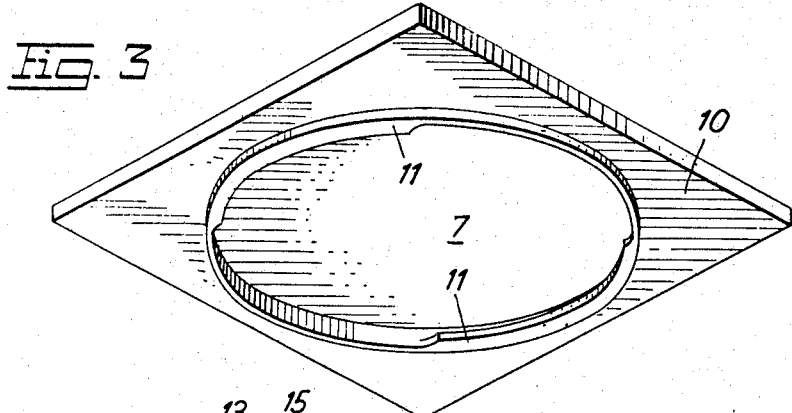
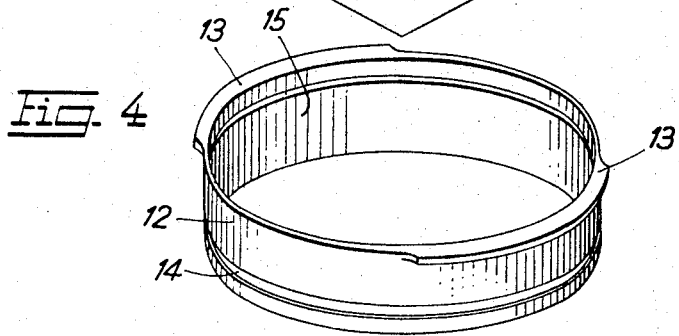
INVENTOR
ERNEST MORF
BY Christel & Bean
ATTORNEYS

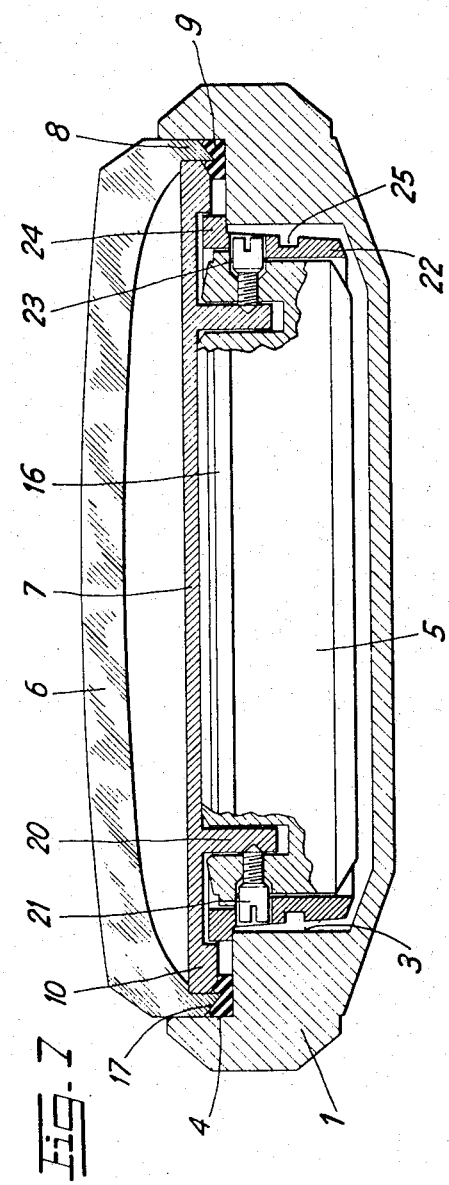

United States Patent Office 3,355,873
Patented Dec. 5, 1967

3,355,873
WATERTIGHT SHAPED WATCH
Ernest Morf, Vaudijon, Colombier,
Neuchatel, Switzerland
Filed July 8, 1965, Ser. No. 470,434
Claims priority application, Switzerland, July 9, 1964,
9,017/64; June 24, 1965, 8,846/65
7 Claims. (Cl. 58—90)

This invention relates to watertight shaped, i.e., non-circular, watches and in particular to watertight shaped watches, the casing of which comprises a sealing gasket interposed and axially pressed between a watchcase part and a part of a glass having a form similar to that of the watchcase.

With the watertight watches the glass fixation raises a problem which is delicate to be solved, in particular if the glass must be set in place so that it can be taken away from and mounted again on the watchcase every time the same must be opened in order to give access to the watch movement and closed again after a correction or a repair has been made.

With the watches having a circular glass the simplest way of satisfactorily solving the problem of tightly fixing the glass onto the watchcase is to cause a peripheral glass sleeve to be pressed radially against a cylindrical or slightly truncated conical surface of the watchcase bezel. With the watches in which the glass can be secured once for ever to the watchcase bezel, it is relatively easy to press the peripheral glass sleeve against the corresponding bezel surface with a sufficient strength in order to constitute a watertight seal between the glass and the remaining watchcase section. If the glass must on the contrary be mounted on the watchcase so that one can remove the same every time the watchcase has to be opened, as required for instance with the watches having a casing comprising only one metallic piece simultaneously serving as bottom, as case-band and as bezel, a proper glass fixation is already more delicate to be provided. Usually the glass fixation is then ensured by means of a strengthening ring located within the peripheral glass sleeve. Such a strengthening ring advantageously permits the peripheral glass sleeve to be strongly pressed against the corresponding cylindrical bezel surface, without generating dangerous stresses in the glass due to too high a bending strain. The greatest difficulties are however encountered with watches, the casing of which comprises only one metallic piece to which the glass has to be tightly and removably secured so as to retain the watch movement axially in place in this metallic piece. With watches of this kind comprising a circular glass those skilled in the art, however, know how these last difficulties can be overcome, because watches having a glass removably fixed to the metallic watchcase section and axially retaining the watch movement in place are manufactured and sold on a large scale.

In order to obtain the desired result with these last watches, the strengthening ring, the peripheral glass sleeve and the corresponding bezel inner surface must be manufactured with the utmost care. For different reasons many watchcase manufacturers had, however, to abandon the idea of offering the advantages of such watchcase as regards assembling the watch as well as ensuring the service thereof after sale; they provided a particular latch for retaining the watch movement axially in place within the watchcase.

The glass fixing method consisting in merely pressing a peripheral glass sleeve or wall between a strengthening ring and the bezel, and which has broadly been adopted with watches having a circular glass, can, however, not be used with shaped watches having a shaped glass. The first of the conditions and also the easiest one to be fulfilled with watches having a circular glass—the tightness of the seal between the glass and the bezel carrying the same—already constitutes a bar with shaped glasses, because a prismatic glass wall extending at the glass periphery cannot be pressed against corresponding surfaces of the watchcase bezel in the same manner as with circular glasses. In particular, a prismatic glass wall cannot possibly be pressed against a corresponding prismatic bezel surface so as to obtain, at every point of said wall, a seal satisfying the modern requirements to be fulfilled by a watch if one wants to sell it as a watertight watch.

For manufacuring a watertight shaped watch in which the glass has a shape similar to that of the watchcase and extends near to the periphery of the latter, and in which the dial is moreover of a standard type and is accordingly constituted by a single plate extending up to the periphery of the glass, the only method known heretofore for tightly fixing the glass to the remaining watchcase section consists in axially pressing a peripheral glass part on a sealing gasket interposed between the glass and a first watchcase piece surrounding the watch movement, and in holding the glass in this state by means of a second watchcase piece, removably fixed to the first one, and provided with an inner rim extending over the glass periphery. From case to case the second watchcase piece is secured to the first one either by screws, by eccentrical plugs, by pins or by latches.

Even with these two watchcase pieces, fixing the glass remains an uneasy task in the known shaped watches. It is indeed rather difficult to secure the two said watchcase pieces to each other in a safe, removable, permanent and sufficiently precise manner so as to generate, on the sealing gasket, a predetermined pressure which should neither be too small (what would immediately jeopardize the tightness of the watch), nor too strong (what would also jeopardize the tightness of the watch after some time by producing a more or less quick destruction of the sealing gasket). The casings of the known watertight shaped watches are, moreover, obviously constructed in a much more intricate manner than the casings of the known watertight circular watches. With respect to the latter, they finally have the drawback of increasing the watch-thickness by the fact that the watchcase piece holding the glass is located at the watchcase periphery, thus rendering it impossible to create a shaped casing with a slendered profile.

This invention, therefore, contemplates providing a watertight shaped watch which does not have the above-mentioned drawbacks and which can be assembled and handled for services after sale as easily as watertight circular watches, the watch improved according to the invention being of course arranged so that it can be provided with a glass having the same shape as the watchcase and extending near to the periphery of the same as well as with a usual dial constituted by a single plate extending up to the periphery of the glass.

It is an object of the invention to provide a glass fixation in a watertight shaped watch so that the glass may, as with watertight circular watches, be removable and of course tightly fixed to a metallic watchcase piece simultaneously constituting the bottom, the case-band and the bezel, the glass thereby being able by itself to prevent the movement from moving axially out of its lodging.

A more particular object of the invention consists in providing a watertight shaped watch in which the glass is removably-held in place solely by a clamping action exerted, at least in two diametrically opposed points, on a glass wall provided at the periphery of the glass and being parallel to the watchcase axis, the clamping action being performed between the dial and a projection of the watchcase constituting the bezel.

Still further objects of the invention will become apparent in the course of the following description.

Three embodiments of the watch according to the invention are represented diagrammatically and by way of example in the accompanying drawings in which similar parts are designated by the same reference numerals.

In the drawings:

FIGURE 1 is an axial section of the first embodiment;

FIGURE 2 is a cross-section on a smaller scale along line II—II of FIGURE 1;

FIGURE 3 is a perspective view of the lower side of the dial of this first embodiment;

FIGURE 4 is a perspective view of another member of the first embodiment;

FIGURE 5 is a sectional view similar to that of FIGURE 1, but showing the second embodiment;

FIGURE 7 is a sectional view similar to those of FIGURES 1 and 5, but showing the third embodiment.

Figure 8:
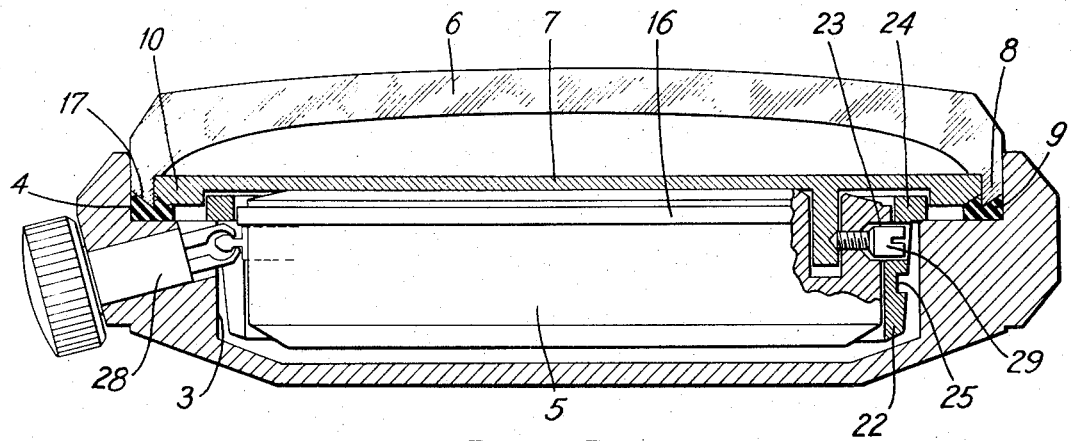
FIGURE 8 is a sectional view similar to FIGURE 7 but showing a further embodiment.

The watch according to the first embodiment comprises a metallic section 1 which simultaneously serves as caseband, as watchcase bottom and as bezel. Section 1 carries lugs 2 (FIGURE 2) for securing a wrist band to the watchcase. Section 1 has a square outer shape in plan view and it is provided with two ledges 3 and 4. The inner ledge 3 is cylindrical and is provided for a circular watch movement 5. As regards ledge 4 it has a shape similar to that of section 1. It is provided for the glass 6 and the dial 7, both having a square shape similar to the outer shape of section 1. The respective sizes of ledges 3 and 4 are chosen in such manner that, in the middle of the watchcase sides, the distance between the side walls of these lodgings is sufficient in order to arrange a wall 8 of glass 6, a sealing gasket 9 and a reinforced dial part 10 therebetween. The dial part 10 extends beyond the periphery of movement 5 and two inner projections 11 (FIGURE 3) are provided on part 10 in diametrically opposed relationship with respect to each other. These projections 11 are intended for permitting the watch movement 5 to be rigidly secured to the dial 7 by means of a member consisting of a ring 12 substantially extending over the whole height of the watch movement 5. Ring 12 carries a pair of outer projections 13 (FIGURE 4) and it is provided in its outer side surface with an annular groove 14 and on its inner side surface with an annular projection 15. The watch movement 5 is located with a snug fit within projection 15 so that an annular outer rim 16 of its baseplate bears on projection 15. Projections 11 of dial 7 and 13 of ring 12 form the corresponding parts of a bayonet joint which ensures a strong and rigid fixation of movement 5 to dial 7.

In order to assemble the watch described, the movement 5 is first secured to the dial 7 by means of ring 12 and the unit obtained is then covered by glass 6 and located together with the glass above lodgings 3 and 4 of the watchcase section 1, in which the sealing gasket 9 has previously been set in place. The glass is then pressed down into ledge 4 until the lower chamfered edge 17 of its wall 8 comes in contact with gasket 9 and presses the same to a sufficient extent in order to constitute a watertight seal between the glass 6 and the watchcase section 1.

The glass 6 remains then in that position, because the wall 8 is radially clamped, at least in two diametrically opposed points, between the dial 7 and the bezel of the watchcase section 1. Conversely, the dial 7 is thus held in place by the benzel and the wall 8 of glass 6. As regards the axial position of dial 7, it is determined by the bottom of ledge 4 on which the dial bears. The watch movement 5, which is rigidly secured to the dial 7 by ring 12, is held in place exclusively by the dial. Neither movement 5 nor ring 12 come in contact with the watchcase section 1.

The watch disclosed comprises a winding and hand-setting stem 28 as shown in FIG. 8 which is made in two pieces. When the outer stem piece has been mounted, it prevents both the movement 5 and the ring 22 from rotating relatively to the dial 7, so that the movement 5 cannot become disassembled from the dial, even if the watch is submitted to impacts or strong vibrations and even through the screw 29 may become loose.

In order to take the movement out of the watchcase, the winding and hand-setting crown is first removed together with the outer stem part. The outlet of a pump well known to those skilled in the art is then connected to the stem passage through the casing wall and the pressure within the watchcase is increased by means of this pump until the glass 6 moves out of its ledge 4. The dial 7 and the movement 5 follow the glass 6 when the same is blown out of its lodging, even if the glass moves out of its lodging faster on one side of the watchcase than on the opposite side. The movement 1 and the ring 12 are indeed spaced apart from the side wall of ledge 3 to a sufficient extent in order to be able to follow the dial 7 even if the same becomes slightly inclined, when the glass is blown out of ledge 4. To then remove the movement 5 and the dial 7 from the glass 6, the ring 12 is gripped by its groove 14. Finally, it suffices to turn this ring, if one wants to remove the movement 5 from the dial 7.

Figure 6:
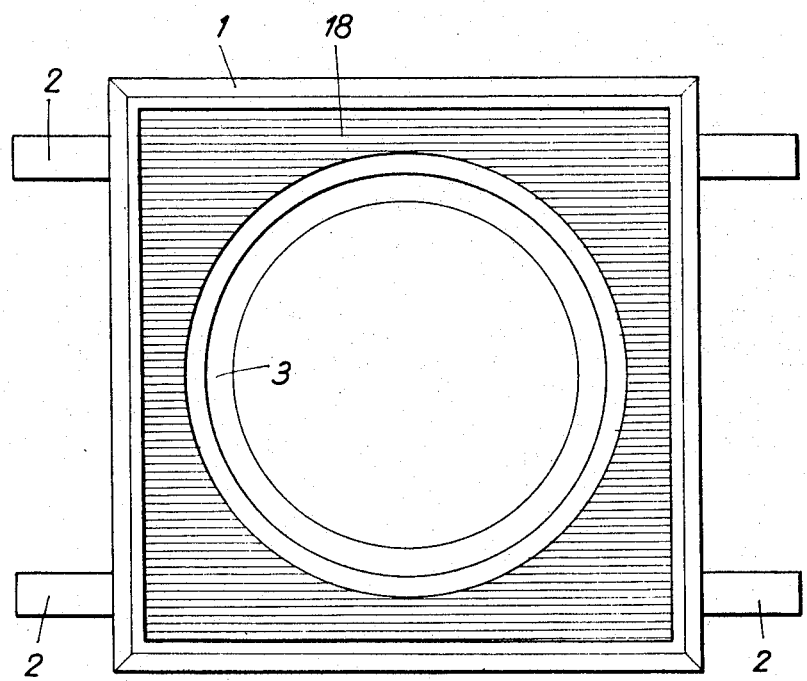
FIGURE 6 is a plan view on a smaller scale and with some parts taken away of this second embodiment.

In order to prevent the sealing gasket 9 from leaving the outer edge of ledge 4, e.g., at the mid-points of the lodging sides, the sealing gasket can be glued to the bottom of this ledge. The sealing gasket can also be given the shape of a frame as represented in the second embodiment (FIGURES 5 and 6). With this second embodiment the sealing gasket 18 is cut out from a sheet material so that its outer contour has the same shape as ledge 4 of the watchcase section 1 and so as to be provided with a circular central opening having a diameter exceeding that of movement 5 to an extent great enough in order to enable the projections 11 of dial 7 to bear on the bottom of ledge 4.

This second embodiment moreover differs from the first one by the fact that the movement 5 is not fixed to the dial 7 by a ring but by a cap 19, which completely surrounds the movement 5 and thus protects the same when it is removed from the watchcase.

With the watch improved according to the invention, the watch movement needs not be fixed to the dial as rigidly as disclosed with the two first embodiments; the dial can just as well be secured to the watch movement in the usual manner, i.e., by means of feet, without any risk for the latter to be torn away from the dial under the action of an impact, as disclosed in the third embodiment (FIGURE 7).

The dial 7 of this third embodiment thus carries a pair of feet 20 extending within matching openings of the movement 5 and secured thereto by means of screws 21 extending in a direction perpendicular to the movement axis.

The movement 5 is inserted in a ring 22 carrying an inner shoulder 23, on which the baseplate rim 16 of the watch movement 5 bears, and an outer shoulder 24 bearing on the bottom of ledge 4 of the watchcase section 1. Ring 22 is moreover provided with an annular groove 25 in its outer surface. Two bores are finally provided in ring 22 for the heads of screws 21, which thus serve to secure ring 22 to movement 5.

In order to assemble the watch of this third embodiment, the movement 5 is first inserted into ring 22 and the dial 7 is then set onto movement 5 and secured thereto by means of screws 21. The unit thus formed is assembled in watchcase section 1 in the same manner as the similar unit of the first embodiment.

With this third embodiment the movement 5 is held in place in transverse direction solely by the dial 7, which is itself held in this direction by the bezel and the wall 8 of glass 6. As regards the axial position of dial 7, it is determined by the bottom of ledge 4 on which shoulder 24 of ring 22 bears. Axially, the movement is thus held in place within the watchcase, in the direction of the glass, by the dial 7, and in the direction of the watchcase bottom, by the shoulders 23 and 24 of ring 22. If the watch is submitted to axial impacts, there will accordingly be no risk that the movement 5 will be torn away from dial 7.

The outer surface of ring 22 is made slightly truncated conical and its sizes are somewhat smaller than those of ledge 3 of the watchcase section 1 so that ring 22 may be introduced into ledge 3 and removed therefrom without any difficulty, even if this ring is not moved exactly along the watchcase axis.

To remove the movement 5 and the dial 7 from glass 6, when the latter has been blown out of lodging 4 of the watchcase section 1, the ring 22 can be gripped by its groove 25. The heads of screws 21 as well as the dial feet 20 are strong enough so that the pull exerted on ring 22 will cause the dial 7 to be removed from the glass 6 without injuring any part of the watch.

Although three embodiments of the invention have been disclosed in detail with reference to the accompanying drawings, it should be understood that various further changes in the shape, sizes and arrangement of parts will appear obvious to those skilled in the art within the scope of the appended claims.

I claim:

1. In a watertight shaped watch, in combination, a movement, a casing having, in plan view, a non-circular shape and an axis perpendicular thereto, said casing comprising a movement receiving section and a glass removably secured to the movement receiving section, said movement receiving section including a case-band having a projection forming a bezel and said glass having a shape similar to that of the casing and a wall located at its periphery and being parallel to the casing axis, said glass wall being shaped to conform to the opening defined by said bezel so as to enter the same, a pair of parts spaced apart from and facing each other in the direction of the casing axis, one of said parts comprising a ledge on said movement receiving section, and the other comprising the outer face of said glass wall, a sealing gasket located between the parts of said pair, and a dial secured to said movement and adapted to the glass wall so as to enter the same and to produce thereon, between the bezel and the dial and at least in two diametrically opposed points of the glass wall, a strong clamping action capable of maintaining the glass in such an axial position relative to said movement receiving section that an axial pressure establishing a tight seal between said glass and said movement receiving section is exerted by said pair of parts on said sealing gasket.

2. A watch according to claim 1, said bezel surrounding a glass lodging and said sealing gasket having a contour matching said glass lodging and being provided with a circular opening.

3. A watch according to claim 1, further comprising a member surrounding said movement and being provided with an inner abutting shoulder for said movement, an outer abutting shoulder arranged for cooperation with said movement receiving section and a pair of lodging holes, and screws fixing said dial to said movement and projecting outwards from the peripheral side surface of said movement into said holes of said member thereby securing said member to said movement, and the latter being axially held in place within said casing, in one direction, by said dial, and in the opposed direction, by said shoulders of said member.

4. In a watertight shaped watch, in combination, a movement, a casing having, in plan view, a non-circular shape and an axis perpendicular thereto, said casing comprising a movement receiving section and a glass removably secured to the movement receiving section, said movement receiving section including an inner space for the movement having sizes larger than those of the movement and a case-band having a projection forming a bezel, said glass having a shape similar to that of the casing and a wall located at its periphery and being parallel to the casing axis, said glass wall being shaped to conform to the opening defined by said bezel so as to enter the same, a pair of parts spaced apart from and facing each other in the direction of the casing axis, one of said parts comprising a ledge on said movement receiving section, and the other comprising the outer face of said glass wall, a sealing gasket located between the parts of said pair, and a dial secured to said movement and holding the same within said inner space of said movement receiving section in spaced apart relationship with respect to said movement receiving section, said dial being shaped to conform to the opening defined by the glass wall so as to enter the same and to produce thereon, between the bezel and the dial and at least in two diametrically opposed points of the glass wall, a strong clamping action capable of maintaining the glass in such an axial position relative to said movement receiving section that an axial pressure establishing a tight seal between said glass and said movement receiving section is exerted by said pair of parts on said sealing gasket.

5. A watch according to claim 4, further comprising a member securing said dial to said movement, said movement being circular, said dial having a part extending beyond the movement periphery and being reinforced, and said member bearing on said movement and gripping said reinforced dial part.

6. A watch according to claim 5, said member consisting of a ring extending at least approximately over the whole movement height.

7. A watch according to claim 5, said member consisting of a cap completely surrounding said movement.

References Cited

UNITED STATES PATENTS

| | | | |
|---|---|---|---|
| 2,264,673 | 12/1941 | Morf | 58—91 |
| 2,872,776 | 2/1959 | Erard | 58—90 |
| 2,936,547 | 5/1960 | Monnier et al. | 58—90 |
| 2,959,912 | 11/1960 | Morf | 58—91 |
| 2,989,838 | 6/1961 | Guggi et al. | 58—90 |
| 3,020,703 | 2/1962 | Wadsworth | 58—90 |
| 3,261,159 | 7/1966 | Simon et al. | 58—90 |
| 3,269,107 | 8/1966 | Morf | 58—90 |
| 3,284,998 | 10/1966 | Nardin | 58—90 |

FOREIGN PATENTS 195,115   4/1938   Switzerland.

RICHARD B. WILKINSON, *Primary Examiner.*

GERALD F. BAKER, *Examiner.*